United States Patent [19]

Nordström

[11] Patent Number: 4,459,863
[45] Date of Patent: Jul. 17, 1984

[54] SHEAR BEAM LOAD CELL

[75] Inventor: Kjell H. Nordström, Västeras, Sweden

[73] Assignee: Safelink AB, Västeras, Sweden

[21] Appl. No.: 406,550

[22] Filed: Aug. 9, 1982

[51] Int. Cl.³ .............................................. G01L 1/22
[52] U.S. Cl. .................. 73/862.66; 177/211; 338/5
[58] Field of Search .......... 73/862.65, 862.66, 862.67, 73/765, 767; 338/5; 177/211

[56] References Cited

U.S. PATENT DOCUMENTS

| 3,520,182 | 7/1970 | Kelk et al. | 73/862.65 |
| 3,736,795 | 6/1973 | Andersson | 73/862.66 |
| 4,237,727 | 12/1980 | Lockery et al. | 73/862.66 |
| 4,364,279 | 12/1982 | Stern et al. | 73/862.66 |

FOREIGN PATENT DOCUMENTS

903941 8/1962 United Kingdom ............. 73/862.65

Primary Examiner—Charles A. Ruehl

[57] ABSTRACT

A shear beam load cell comprising a cantilevered beam member having a free end weigh section for receiving a load force to be measured, a mounting section for securing the beam member, and recesses formed in opposing sides of the cantilevered beam free end weigh section for defining an unsymmetrical I-shaped cross-section. The recesses have dimensions such that one of the recesses has its bottom wall surface insensitive to torsion. In one embodiment, the recess with the bottom surface insensitive to torsion has a depth longer than the other recess. In another embodiment, the recess with the bottom surface insensitive to torsion has a height shorter than the other recess. A strain gage sensing device is positioned in that one recess on that bottom wall surface insensitive to torsion for measuring the shear strain corresponding to the load force applied to the free end weigh section of the beam member. This shear beam load cell requires only a strain gage sensing device in that one recess connected to the four different arms of a Wheatstone bridge circuit for electrically measuring the principal shear strains associated with the load force.

22 Claims, 46 Drawing Figures

SHEAR BEAM LOAD CELL

BACKGROUND OF THE INVENTION

This invention relates to a shear beam load cell and, more particularly, to a low-cost shear beam load cell with reduced sensitivity to adverse load conditions.

Strain gage devices have proven effective for various industrial applications, such as for measuring axial load forces on equipment shafts, bending stresses on track rails for weighing railway cars, and the like. For example, U.S. Pat. Nos. 3,151,306 and 3,937,075 disclose strain gage devices adapted to measure axial load forces.

One particular type of strain gage device has now received significant recognition for industrial weighing applications. This device is commonly referred to as a shear beam load cell because it employs strain gages positioned to measure shear in a beam-shaped cell and connected to an appropriate electrical circuit for sensing the strain caused by the stresses of shear imposed on the beam, and thereby produce readings which are proportional to a load to be measured applied substantially perpendicular to the longitudinal direction of the beam. The shear beam load cell can measure both large and small loads, is accurate and can be used in many different industrial weighing environments. The shear beam load cell is also low-profile, small in size, and has low sensitivity to changes in point-of-load application and to adverse side forces. Examples of shear-responsive strain gage weighing devices are disclosed in U.S. Pat. Nos. 3,554,025; 3,734,216 and 3,448,424.

Despite the numerous advantages of shear beam load cells over other types of strain gage load cells and weighing devices, there remain problems with and disadvantages of the known shear beam load cells, particularly costs due to the components used in the load cell and the assembly of same, and accuracy in measuring the load applied to the shear beam load cell. Such problems are inherent to the design of the conventional shear beam load cell. For example, in order to properly measure the shear strain caused by the stresses in the beam of the conventional load cell, it has been necessary to place strain gages on opposite sides of the beam, each gage oriented essentially at 45 degrees to the longitudinal neutral axis of the beam. The positioning of the strain gages on the opposite sides of the load cell is critical to measurement accuracy because the load cell typically receives adverse twisting moments or torsion during the load application, thereby effecting proper measurement. Theoretically, if the strain gages are precisely positioned on the opposite sides of the shear beam and have exactly the same strain sensitivity, the torsional effects are cancelled. However, such precise perfect balancing is difficult to obtain. Typically, prior efforts to improve load measurement accuracy in the conventional shear beam cell design have resulted in higher costs. Reversely, prior efforts to lower the costs of a shear beam load cell have resulted in reduced load measurement accuracy.

Figures 1A, 1B:
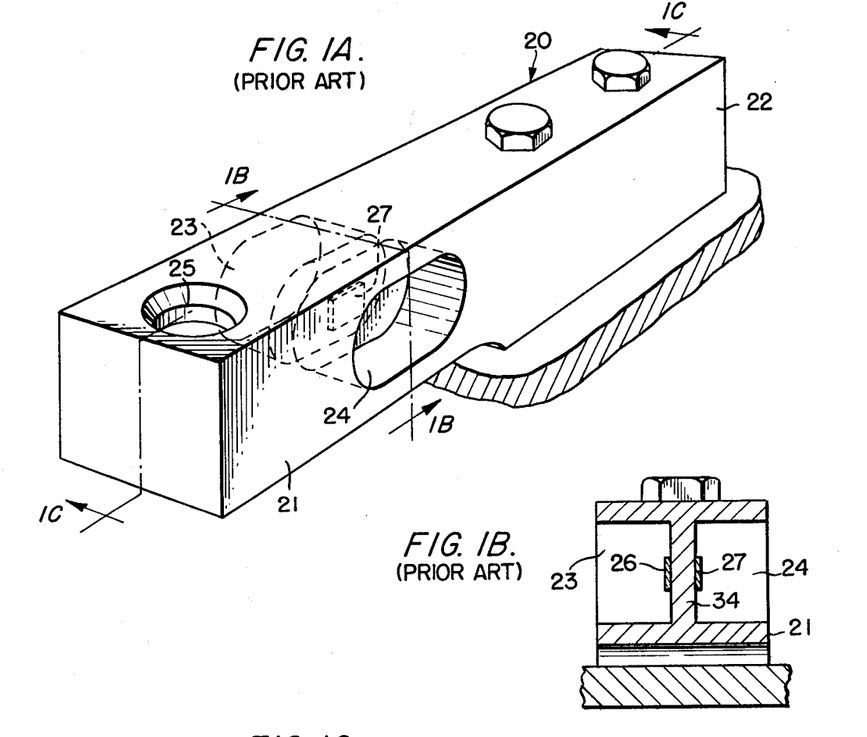
FIG. 1A is a perspective view of a prior art shear beam load cell, employing a cantilevered beam member having elongated identically-dimensioned blind holes formed in diametrically opposite sides of the cantilevered beam member for defining a symmetrical I-shaped cross-section.
FIG. 1B is a cross-sectional view of the load cell shown in FIG. 1A, taken along the line 1B—1B of FIG. 1A, illustrating specifically the symmetrical I-shaped cross-section and the positioning of two strain gage devices on opposite sides of the web of the I-shaped cross-section for measuring shear strain associated with the load (F)
Figure 1C:
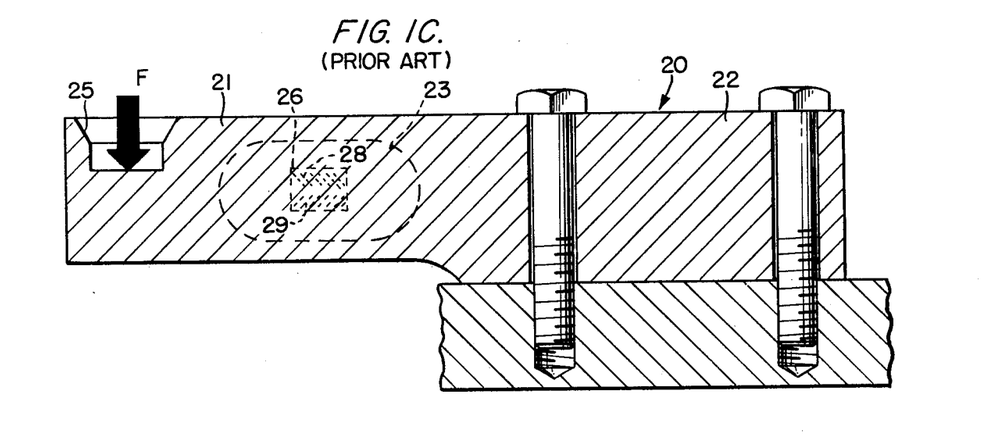
FIG. 1C is a sectional view of the load cell shown in FIG. 1A, taken along the line 1C—1C of FIG. 1A, illustrating specifically the application of the load (F) and the positioning of strain gages in one of the elongated blind holes.

Examples of improved shear beam load cells from the standpoint of accuracy are disclosed in U.S. Pat. Nos. 3,554,025; 3,960,228; 3,949,603; 4,282,748; and 4,237,727. One prior art shear beam load cell is illustrated in FIGS. 1A–1C of the drawings. This load cell has a cantilevered beam suitably secured to a foundation or other mounting means in such a manner that the free deflectable weigh end of the beam is suitably supported for receiving a vertical load force to be measured. In this particular load cell, as further disclosed in U.S. Pat. No. 3,960,228 issued to the same inventor, Kjell H. Nordström, a recess is formed in the cantilevered beam free end in the load-measuring direction, with the force of the load being applied to a load bearing surface within the recess. The load bearing surface within the recess is located in proximity to the longitudinal neutral axis of the shear beam, thus minimizing the moment arm and the twisting moment of an adverse side force affecting the shear beam load cell. Thus, this load cell design has reduced load measurement inaccuracy that is due to imperfect positioning of the strain gages on opposite sides of the shear beam and which commonly occurs in manufacturing such load cells.

For the prior art shear beam load cells, there is also the known practice of forming identically-dimensioned blind holes at diametrically-opposed sides of the cantilevered beam for defining a symmetrical I-shaped cross-section with a flat web located between the blind holes. The strain gages, instead of being positioned on the opposing outer surfaces of the beam, are positioned in each of these holes at the opposing side walls of the flat web. Again, the gages are oriented at a 45° angle to the longitudinal neutral axis of the beam.

The symmetrical I-shaped beam cross-section improves the functioning of the shear beam load cell. Typically, with an I-beam, the shear strain is highest and relatively uniform in the web area. Therefore, the I-beam configuration is useful for the purpose of maximizing shear related stresses at a location where bending related stresses are relatively low. Shear strain measurement is thus maximized with the load cell being less sensitive to changes in the point of load application. Even in this known shear beam load cell design, however, precise positioning of the strain gages must be made in the diametrically-opposed holes of the symmetrical I-beam cross-section in order that they exactly cancel out the effects of twisting moments or torsion from adverse side forces or an off-centered load received by the load cell.

From the foregoing, it can be seen that the conventional shear beam load cells are still plagued by sensitivity to adverse torsion and twisting moments due to off-centered loads and/or adverse side forces, and still require costly construction to maintain or improve measurement accuracy, due to the components and assembly of same. That is, two sets of composite strain gage devices still have to be used, be precisely positioned on each side of the shear beam, and be of the same strain sensitivity to exactly cancel the effect on the other side of the beam. As noted previously, such precise, perfect positioning is difficult to obtain as a practical matter in mass production of these load cells. To the extent precise positioning is being attempted, the costs of manufacturing such shear beam load cells increases tremendously. Even with good positioning of the two opposing strain gage devices, other factors, such as temperature variations in the shear beam, continue to adversely affect proper cancellation.

A new type of shear beam load cell is desired which maintains all of the advantages of a shear beam load cell over other weighing devices, yet which is lower in cost, simpler in construction and more economical to assemble, and improves the accuracy of the load measurement by minimizing significantly the sensitivity to torque and off-centered loads, temperature variations in the shear beam, and the like, over the conventional shear beam load cell.

SUMMARY OF THE INVENTION

Accordingly, it is a primary object of this invention to eliminate the above-described problems of the conventional shear beam load cell, yet maintain all the required and advantageous features of shear beam load cells and achieve further significant goals, including simplicity in construction, reduction in components for the shear beam load cell, simpler assembly of the shear beam load cell, a lower cost shear beam load cell, and improved accuracy of the weighing by significantly reducing sensitivity to adverse torsional forces.

A specific object of this invention is to provide a shear beam load cell which does not require use of two separate strain gage sensing devices located on diametrically opposed sides of the shear beam to measure the shear strain corresponding to the load, thereby resulting in a fewer component, easier assembled, simpler and less costly shear beam load cell.

It is another object of the present invention to provide a shear beam load cell which does not require two separate strain gage sensing devices to be located on diametrically opposed sides of the shear beam to cancel the effect of off-centered loads and twisting moments, thereby resulting in a more accurate shear beam load cell having less sensitivity to same.

Yet another object of this invention is to provide a shear beam load cell which is not affected by temperature variations between opposing sides of the shear beam on which two strain gage sensing devices are positioned, thereby resulting in a more accurate shear beam load cell having less sensitivity to such temperature variations.

It is another object of this invention to provide a shear beam load cell which can utilize many of the standardized load cell components already in the industry, yet provide a new type of shear beam load cell which is simpler, less costly and even more accurate in weigh measurement.

Additional objects and advantages of the invention will be set forth in part in the description which follows, and, in part, will be obvious from the description, or may be learned by practice of the invention. The objects and advantages of the invention may be realized and obtained by means of the instrumentalities and combinations particularly pointed out in the appended claims.

To achieve the foregoing objects and in accordance with the purpose of the invention, as embodied and broadly described herein, the shear beam load cell comprises: (1) a beam member, most frequently a cantilevered beam member, having—(a) a first deflectable weigh portion for receiving a load force to be measured, (b) a second relatively rigid support portion for supporting the beam member, and (c) recesses formed in opposing sides of the first weigh portion for defining an unsymmetrical I-shaped transverse cross-section, wherein the recesses have dimensions such that the bottom wall surface of one of the recesses is insensitive to torsion; and (2) strain gage sensing means positioned in the recess on the bottom wall surface insensitive to torsion for measuring the shear strain corresponding to the load force received by the first weigh portion.

The strain gage sensing means positioned in the recess on the bottom wall surface insensitive to torsion comprises four strain gages mounted at 45° and 135° angles symmetrically to or along the longitudinal neutral axis of the first weigh portion, each gage respectively connected to the four different arms of a full Wheatstone bridge circuit for electrically measuring the principal tensile and compressive shear strains corresponding to the load force. In all of the embodiments of the shear beam load cell of this invention, only one strain gage sensing means is required in the one recess at the bottom surface insensitive to torsion for proper and accurate measurement of the shear strain corresponding to the load force.

In one embodiment of the shear beam load cell, the recess with the bottom surface insensitive to torsion has a depth longer than the other recess. In yet another embodiment, the recess with the bottom surface insensitive to torsion has a height smaller than the other recess.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Reference will now be made in detail to the present preferred embodiments of the invention, examples of which are illustrated in the accompanying drawings.

As noted above, the present invention achieves a low-cost shear beam load cell by using a single strain gage sensing device with yet a more accurate measurement of the load force by reducing sensitivity to adverse torque forces and off-centered loads.

The shear beam load cell generally comprises a beam member and strain gage sensing means. In the embodiment of the load cell of FIG. 10A, the beam member is a cantilevered beam member 42 having a first free and deflectable weigh section 44 for receiving at one end thereof the force of a load to be measured, designated by the letter F (FIG. 10D). The beam member 42 also has a second section 46 for mounting beam member 42 to a foundation or other like securing surface, such as by high strength bolts 48. Elongated blind recesses 50 and 52 are formed in opposing sides of the cantilevered weigh section 44, as illustrated in FIGS. 10A, 10B, 10C, and 10D.

In accordance with the invention, the recesses 50 and 52 have dimensions for defining an unsymmetrical I-shaped transverse cross-section such that the bottom wall surface of one of the recesses is made insensitive to torsion. The term "bottom surface insensitive to torsion" is used herein, including the claims, to mean that a strain gage sensing means mounted on that bottom surface of the recess will be insensitive to strain measured by it that is caused by stresses associated with torsional forces.

Figures 10A, 10B:
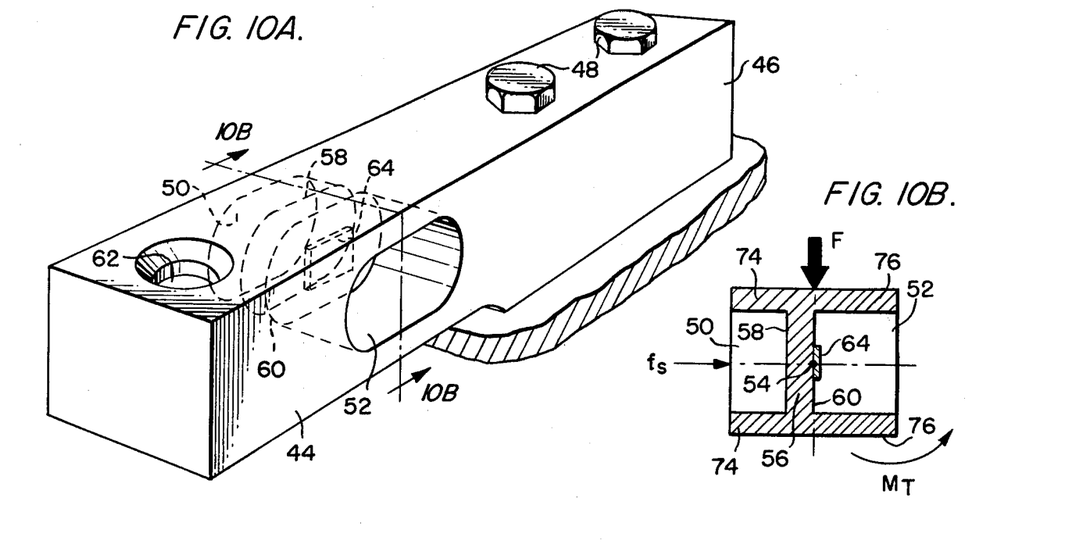
FIG. 10A is a perspective view of a preferred embodiment of the shear beam load cell in accordance with the invention, employing a cantilevered beam member having elongated blind recess formed in opposite sides of the cantilevered beam member with dimensions for defining an unsymmetrical I-shaped cross-section such that a single strain gage device, positioned on one side of the web of the unsymmetrical I-shaped cross-section at the bottom surface of a recess which is insensitive to torsion, measures the shear strain associated with the load $(F)$.
FIG. 10B is a cross-sectional view of the load cell shown in FIG. 10A, taken along the line 10B-1B of FIG. 10A, illustrating specifically the unsymmetrical I-shaped cross-section having dimensions wherein the recess with the bottom surface insensitive to torsion has a depth longer than the other recess, the positioning of the single strain gage device in the one recess on the bottom wall surface insensitive to torsion, and the application of a load $(F)$, and adverse side force $(f_S)$ and twisting moment $(M_T)$.
Figure 10C:
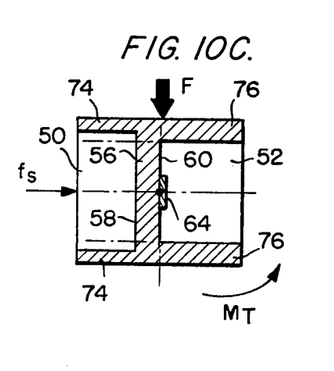
FIG. 10C is a cross-sectional view of a second embodiment of the load cell shown in FIG. 10A, taken along the line 10B—10B of FIG. 10A, illustrating specifically the unsymmetrical I-shaped cross-section having dimensions wherein the recess with the bottom surface insensitive to torsion has a height shorter than the other recess, the positioning of the single strain gage device in the one recess on the bottom wall surface insensitive to torsion, and the application of a load $(F)$, and adverse side force $(f_S)$ and twisting moment $(M_T)$.
Figure 10D:
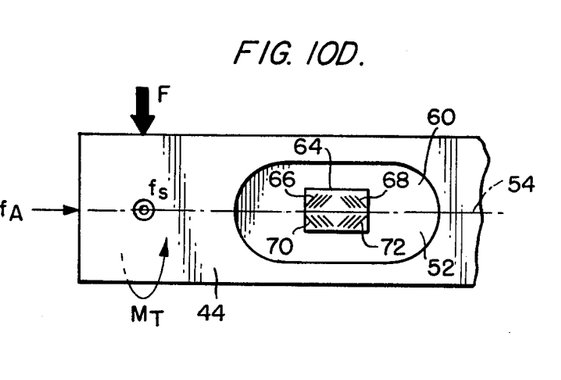
FIG. 10D is a partial side view of the load cell shown in FIG. 10A, illustrating specifically the symmetrical orientation of the strain gages mounted in the recess on the one bottom wall surface insensitive to torsion and the application of a force (F) and adverse side force ($f_S$), axial force ($f_A$) and twisting moment ($M_T$) to the beam member of the load cell.

As embodied herein and seen in FIGS. 10A, 10B and 10D, the recesses 50 and 52 are formed along the length of the weigh section 44 of beam member 42 at a location between the mounting section 46 and the point on the weigh section 44 at which the load F is applied. The load measuring direction generally extends substantially perpendicular to the longitudinal axis 54 of the beam weigh section 44. The unsymmetrical I-shaped cross-section formed by the recesses 50 and 52 generally defines a flat web 56 vertically disposed between the recesses and having side walls forming bottom surfaces 58 and 60, respectively, of the recesses 50 and 52. The flat web 56 is in a plane substantially parallel to the longitudinal neutral axis 54 of the weigh section 44 and substantially parallel to the load F applied to the weigh section 44. A hole 62 is provided at the forward end of the weigh section 44 in the load measuring direction for receiving a load force therein.

Figure 14A:
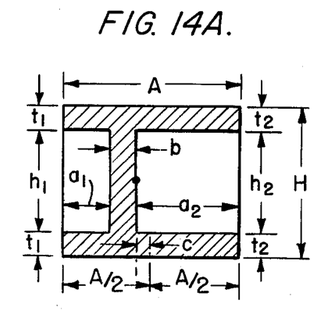
FIG. 14A is a cross-sectional view, similar to FIG. 10B, of the load cell of FIG. 10A, illustrating specifically the recess with the bottom surface insensitive to torsion having a depth longer than the other recess and the various dimensions of the flanges, web and recesses for forming the unsymmetrical I-shaped cross-section such that the bottom wall surface of the one recess is made insensitive to torsion.
Figure 14B:
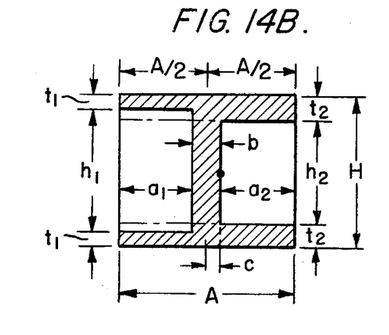
FIG. 14B is a cross-sectional view, similar to FIG. 10C, of the load cell of FIG. 10A, but illustrating specifically the recess with the bottom surface insensitive to torsion having a height shorter than the other recess and the various dimensions of the flanges, web and recesses for forming the unsymmetrical I-shaped cross-section such that the bottom wall surface of the one recess is made insensitive to torsion.

In the first embodiment of the load cell of FIG. 10A, the unsymmetrical I-shaped transverse cross-section is configured, as best seen in FIGS. 10B and 14A, such that the recess 52 is formed with the bottom surface 60 insensitive to torsion by having a depth $a_2$ longer than the depth $a_1$ of the other recess 50. In a modification to the load cell of FIG. 10A, the unsymmetrical I-shaped transverse cross-section is configured, as best seen in FIGS. 10C and 14B, such that the recess 52 with the bottom surface insensitive to torsion has a height $h_2$ shorter than the height $h_1$ of the other recess 50. The specific manner in which the dimensions of the recesses 50 and 52 are determined so that the bottom wall surface 60 of recess 52 is made insensitive to torsion is explained in detail hereafter.

In addition to the beam member having the above-described features, the load cell of this invention further comprises a strain gage sensing means positioned in the recess on the bottom wall surface insensitive to torsion for measuring the shear strain corresponding to the load F. In all of the embodiments for the load cell of this invention, the strain gage sensing means comprises a composite strain gage device that need be positioned in only the one recess on the bottom wall surface which is insensitive to torsion for properly and accurately measuring the shear strains corresponding to the magnitude of the load F applied to the load cell.

In the FIG. 10A embodiment of the load cell, and as further illustrated in FIGS. 10B, 10C, and 10D, the strain gage sensing means comprises a single composite strain gage device 64 mounted on the bottom wall surface 60 of the recess 52. As best seen in FIG. 10D, the strain gage device comprises four strain gages 66, 68, 70, and 72 positioned on surface 60 at 45° and 135° angles symmetrically to the longitudinal neutral axis 54 of the weigh section 44. These gages are electrically connected together in the four arms of a full Wheatstone bridge circuit for measuring the principal shear strains caused by the stresses associated with the load F applied to the weigh section 44 of beam member 42. The connection of the four strain gages in the Wheatstone bridge circuit is illustrated in FIGS. 11A through 11D.

Figure 11A:
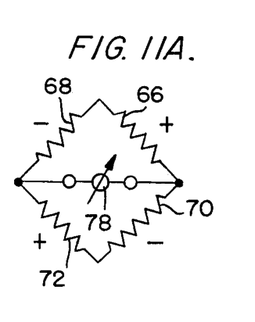
FIG. 11A is a schematic diagram of the strain gages of the load cell of FIGS. 10A and 10D connected together in the arms of a Wheatstone bridge circuit, illustrating specifically the compressive and tensile strains due to shear stresses associated with the load (F) and measured by the respective strain gages for producing a signal corresponding to that load (F)
Figure 11B:
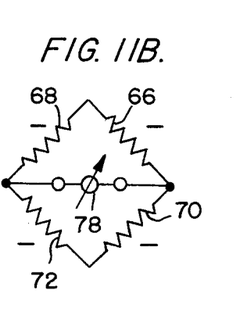
FIG. 11B is a schematic diagram of the strain gages, similar to FIG. 11A, but illustrating specifically the compressive strain due to stresses associated with the axial forces ($f_A$) and measured by the respective strain gages but cancelled by the circuit.
Figure 11C:
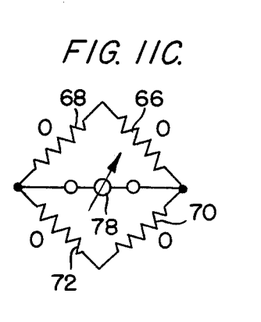
FIG. 11C is a schematic diagram of the strain gages, similar to FIG. 11A, but illustrating specifically the absence of strain due to bending stresses associated with the side force ($f_S$) measured by the respective strain gages.
Figure 11D:
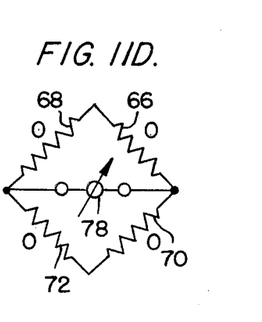
FIG. 11D is a schematic diagram of the strain gages, similar to FIG. 11A, but illustrating specifically the absence of compressive and tensile strain due to shear stresses associated with the twisting moment ($M_T$) measured by the respective strain gages.

FIGS. 11A–11D also indicate the compressive and tensile strain measured by strain gages 66, 68, 70, and 72 in response to a load F (FIG. 11A), and axial force $f_A$ (FIG. 11B), a side force $f_S$ (FIG. 11C), and a twisting moment $M_T$ (FIG. 11D). As will be explained in greater detail hereafter, the single strain gage device 64 provided in recess 52 on bottom wall surface 60 which is made insensitive to torsion requires no cancellation of those strains due to the stresses associated with torsion, i.e., twisting moment $M_T$ or an off-centered load $F_l$, as in the prior art shear beam load cell, because the strain measured by the strain gages of device 64 is zero. This invention thus provides a new type of shear beam load cell which is not only low in manufacturing cost but one which also has significantly reduced sensitivity to adverse torsion conditions. To appreciate the significance of this new type of shear beam load cell over the conventional load cells, reference is again made to the prior art load cell depicted in FIGS. 1A–1C.

As noted in the "Background of the Invention" section, the prior art shear beam load cell of FIGS. 1A–1C employs a beam member 20 having a cantilevered beam end 21 and a mounting end 22. Identically dimensioned recesses 23 and 24 are provided on diametrically opposite sides of cantilevered beam end 21 for forming a symmetrical I-shaped cross-section, as best seen in FIG. 1B, between the securing end 22 and a load receiving hole 25 in which the force of a load F is applied. In the recesses 23 and 24, there are respectively mounted two composite strain gage devices 26 and 27. The devices 26 and 27 also respectively comprise at least two strain gages 28, 29 and 30, 31 oriented at 45° and 135° angles symmetrically to the longitudinal neutral axis 32 of the cantilevered beam member 20, as illustrated in FIGS. 1C and 6B. The pairs of strain gages 28, 29, and 30, 31, on the opposing sides of the symmetrical I-shaped beam cross-section are then electrically connected together in the four arms of a full Wheatstone bridge circuit as illustrated in FIGS. 7A–7D for measuring the principal shear strains due to the stresses associated with the load F applied to the weigh end 21. FIGS. 7A–7D also indicate the compressive and tensile strains measured by the strain gages 28, 29, 30, and 31 caused by stresses associated with to a force F (FIG. 7A), an axial force $f_A$ (FIG. 7B), a side force $f_S$ (FIG. 7C), and a twisting moment $M_T$ (FIG. 7D).

Figure 2A:
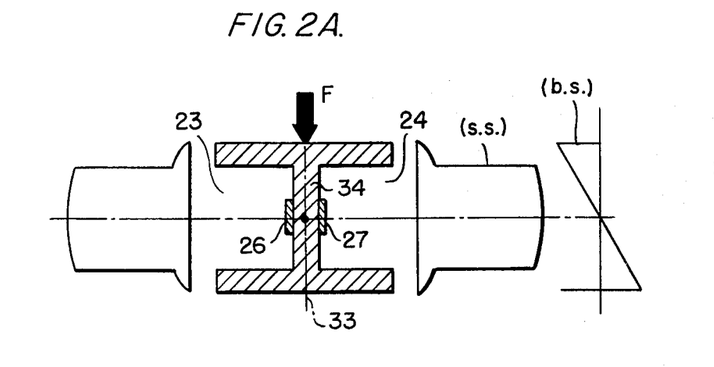
FIG. 2A is a cross-sectional view, similar to FIG. 1B, of the load cell of FIG. 1A, but illustrating specifically application of a pure load (F) centered in the load measuring direction, and a diagram of the shear and bending stresses distributed along the symmetrical I-shaped cross-section of the beam associated with the pure load (F)
Figure 2B:
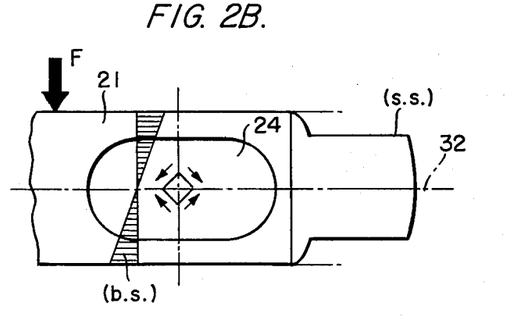
FIG. 2B is a partial side view of the load cell of FIG. 1A, illustrating specifically the principal planes of compressive and tensile shear strain associated with a pure load (F) applied to the beam of the load cell, and a diagram of the bending and shear stresses distributed along the symmetrical I-shaped cross-section of the beam associated with the load (F)
Figure 2C:
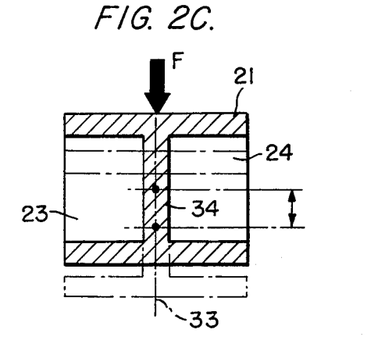
FIG. 2C is a cross-sectional view, similar to FIG. 2A, of the load cell of FIG. 1A, but illustrating specifically the bending deflection in the symmetrical I-shaped cross-section of the beam which occurs when a pure load (F) is applied to the beam.

As noted previously, the I-shaped beam configuration for a shear beam load cell is useful for the purpose of maximizing shear stresses at a location where the bending stresses are relatively low. FIG. 2A shows the shear stresses (s.s) and bending stresses (b.s.) distributed along the symmetrical I-beam cross-section, wherein the shear stresses are highest in the web section of the I-beam cross-section and the bending stresses are theoretically zero at the longitudinal neutral axis along the web of the I-beam cross-section where the strain gages are mounted. The principal planes of the compressive and tensile shear strain due to stresses associated with the load F follow a 45° angle orientation with respect to the longitudinal axis of the cantilevered beam member, as illustrated in FIG. 2B. With a pure load F applied to a symmetrical I-beam cross-section, a deflection of the cantilevered beam member results as depicted in FIG. 2C.

Figure 3A:
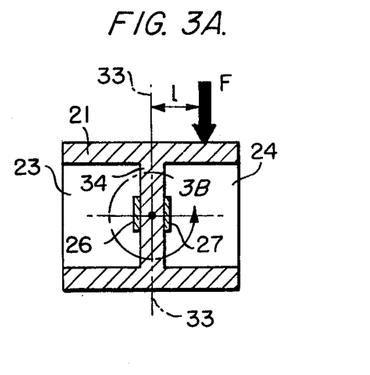
FIG. 3A is a cross-sectional view, similar to FIGS. 1B and 2A, of the load cell of FIG. 1A, but illustrating specifically application of a load (F) off-centered by a distance (l).
Figure 3B:
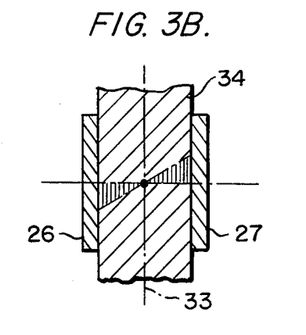
FIG. 3B is a partial enlarged view of the load cell shown in FIG. 3A, but illustrating specifically the additional compressive and tensile strain from stresses in the web of the symmetrical I-shaped cross-section associated with torsion when the off-centered load $(F)_l$ is applied.
Figure 4A:
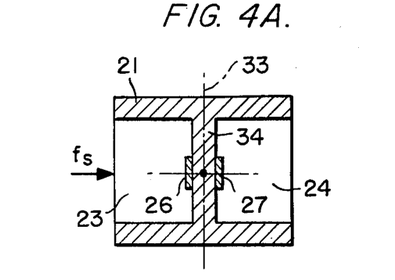
FIG. 4A is a cross-sectional view, similar to FIGS. 1B, 2A, and 3A, of the load cell of FIG. 1A, but illustrating specifically application of a side force $(f_S)$.
Figures 4B, 4C:
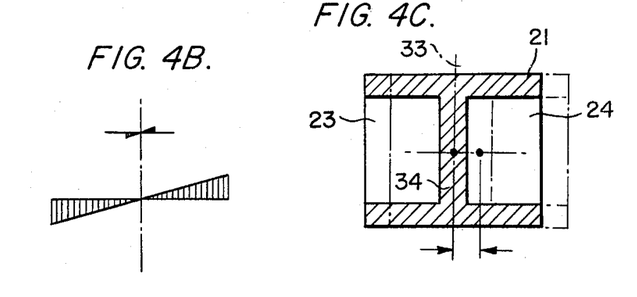
FIG. 4B is a partial enlarged view of the load cell shown in FIG. 4A, but illustrating specifically the additional bending stresses distributed along the flanges and web of the symmetrical I-shaped cross-section associated with the side force.
FIG. 4C is a cross-sectional view, similar to FIG. 4A, of the load cell of FIG. 1A, but illustrating specifically the bending deflection in the symmetrical I-shaped cross-section when the side force is applied.
Figure 5A:
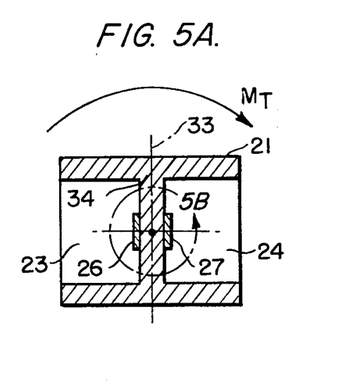
FIG. 5A is a cross-sectional view, similar to FIGS. 1B, 2A, 3A, and 4A, of the load cell of FIG. 1A, but illustrating specifically application of a twisting moment $(M_T)$.
Figure 5B:
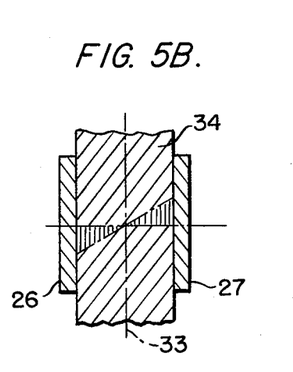
FIG. 5B is a partial enlarged view of the load cell shown in FIG. 5A, but illustrating specifically the additional shear stresses distributed in the web of the symmetrical I-shaped cross-section associated with the twisting moment.

In practice, however, the stresses on a shear beam load cell are not limited to those of the pure load F which is to be measured. There is most generally stresses caused by torsion and adverse forces, such as from an off-centered load $F_l$ illustrated in FIG. 3A, a side force $f_S$ illustrated in FIG. 4A, and/or a twisting moment $M_T$ illustrated in FIG. 5A. The additional compressive and tensile strain due to stresses along the symmetrical I-shaped cross-section associated with such adverse forces and torsion on the I-beam cross-section are respectively shown in FIGS. 3B, 4B, and 5B. For example, there are additional shear stresses superimposed on the stresses associated with a pure load F when an off-centered load $F_I$ is applied to a symmetrical I-beam cross-section as illustrated FIG. 3B. There is also additional compressive and tensile strain due to bending stresses distributed along the flanges and web of the symmetrical I-shaped cross-section when a side force $f_S$ is applied to a symmetrical I-beam cross-section as shown in FIG. 4B. As with an off-centered load $F_I$, there are also the additional shear stresses distributed in the web of a symmetrical I-shaped cross-section which are associated with a twisting moment $M_T$ as shown in FIG. 5B and which are superimposed on the stresses associated with a pure load F.

Figure 3C:
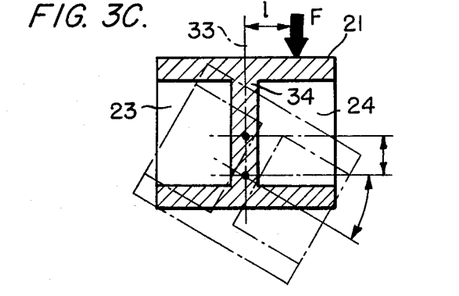
FIG. 3C is a cross-sectional view, similar to FIG. 3A, of the load cell of FIG. 1A, but illustrating specifically the bending deflection and rotation in the symmetrical I-shaped cross-section of the beam when the off-centered load force $(F)_l$ is applied.
Figure 5C:
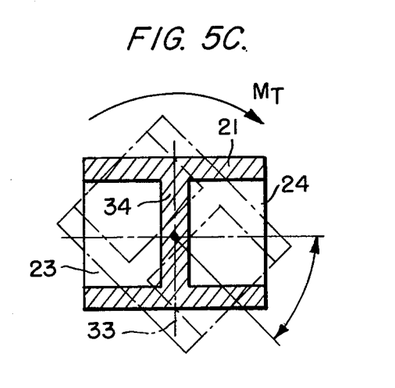
FIG. 5C is a cross-sectional view, similar to FIG. 5A, of the load cell of FIG. 1A, but illustrating specifically the rotation of the symmetrical I-shaped cross-section when the twisting moment is applied.

The deflections associated with $F_I$, $f_S$, and $M_T$ when they are applied to the symmetrical I-beam cross-section are respectively shown in FIGS. 3C, 4C, and 5C. In the symmetrical I-beam cross-section, the neutral axis of torsion and centroidal axis both coincide with the center line 33 passing through the middle of the web 34 of the symmetrical I-beam cross-section as depicted in FIGS. 3C, 4C, and 5C. With an off-centered load $F_I$ applied to the symmetrical I-beam cross-section, there is both a downward deflection and a rotation shown in phantom lines in FIG. 3C. With a side force $f_S$ applied to the symmetrical I-beam cross-section, there is a sideward deflection shown in phantom lines in FIG. 4C. With a twisting moment $M_T$ applied to the symmetrical I-beam cross-section, there is a rotation about the centroid shown in phantom lines in FIG. 5C.

In order to accurately measure only the principal shear strains corresponding to the magnitude of the load F, it is necessary to eliminate any signal output from the Wheatstone circuit corresponding to the adverse stresses associated with the off-centered load force $F_I$, side force $f_S$, or twisting moment $M_T$. As noted earlier, the I-beam cross-section was significant to reduce sensitivity to adverse side forces because the strain gages 27–31 are mounted on opposite sides of the web 34 close to the neutral plane of the beam in the center of the web of the symmetrical I-beam cross-section as seen in FIGS. 3A, 4A, and 5A. While proximity of the strain gages to the neutral plane of the symmetrical I-beam cross-section reduces sensitivity to such adverse side forces, it is still necessary to cancel the effect of the stresses due to torsion and twisting moments to provide accurate measurement of the load force itself. Thus, it has been necessary to precisely position the strin gages 28–31 on the opposite sides of the flat web and then connect them from both sides together in a full Wheatstone bridge circuit to cancel signal output of the strain caused by such spurious stresses, as will now be described by further reference to FIGS. 6A and 6B and FIGS. 7A–7D.

Figure 6A:
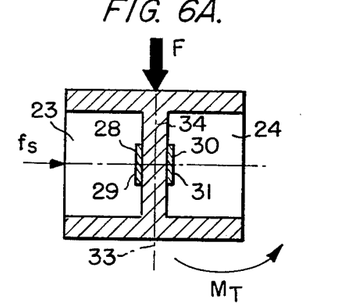
FIG. 6A is a cross-sectional view, similar to FIG. 2A, of the load cell of FIG. 1A, but illustrating specifically the application of a centered load $(F)$ and an adverse side force $(f_S)$ and twisting moment $(M_T)$ to the beam member of the load cell.
Figure 6B:
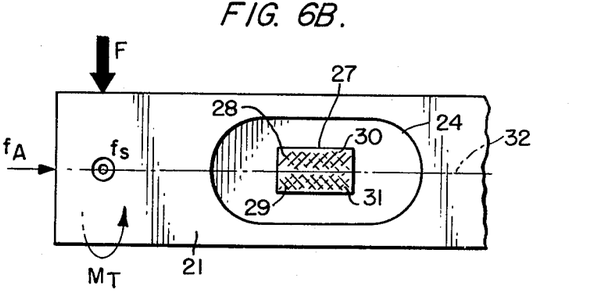
FIG. 6B is a partial side view of the load cell shown in FIG. 6A, illustrating specifically the symmetrical mounting and orientation of the strain gages mounted in the respective elongated blind holes and the application of a load $(F)$ and adverse side force $(f_S)$, axial force $(f_A)$ and twisting moment $(M_T)$ to the beam member of the load cell.

FIGS. 6A and 6B illustrate the load cell having a symmetrical I-beam cross-section and strain gage devices 26 and 27 in the identically-dimensioned recesses 23 and 24 on opposite sides of the web with a pure load F, and axial force $f_A$, a side force $f_S$, and a twisting moment $M_T$ applied to the beam member 20. FIG. 6B shows the positioning of the strain gages 28–31 with strain gages 28 and 29 shown on one side of the web in recess 23 at 45° and 135° angles to the longitudinal neutral axis of the cantilevered end 21 and the comparable component of strain gages 30 and 31 in the opposite recess 24 formed at 45° and 135° angles to the longitudinal neutral axis of the cantilevered end 21. In sum, the two pairs of strain gages 28, 29, and 30, 31, respectively, are mounted in the recesses symmetrically relative to each other on opposite sides of the beam in such a way that the two strain gages in each pair 28, 29, and 30, 31, respectively, are affected by the deformations of the beam material in two mutually perpendicular directions forming an angle at 45° to the longitudinal axis of the beam. In this way, the two strain gates 28 and 31 are affected by compression or negative tension, whereas the two other strain gages 29 and 30 are affected by tension in the beam material.

The strain gages 28–31 must then be electrically connected together in the four branches of the Wheatstone bridge circuit as shown in FIGS. 7A–7D. The bridge has one diagonal connected to a voltage source and its other diagonal connected to a voltage measuring instrument 35. The two gages 29 and 30 affected by tension (+) are connected in two opposite branches of the bridge, whereas the two gages 28 and 31 affected by compression or negative tension (−) are connected in the other opposite branches of the bridge. In the Wheatstone bridge circuit, if R equals the resistance of the strain gages 28, 29, 30, and 31, which resistances R are conventionally made equal, $\Delta r$ represents the increase in resistance in the respective strain gages associated with a stress measurement, then the following formula applies:

$$(R_{28} \pm \Delta r_{28}) \times (R_{31} \pm \Delta r_{31}) = (R_{29} \pm \Delta r_{29}) \times (R_{30} \pm \Delta r_{30});$$

and, when $$R_{28} = R_{29} = R_{30} = R_{31},$$

then $$(\pm \Delta r_{28}) \times (\pm \Delta r_{31}) = (\pm \Delta r_{29}) \times (\pm \Delta r_{30}).$$

Figure 7A:
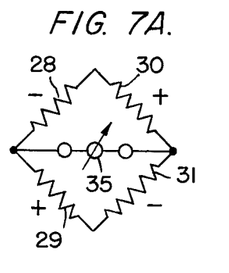
FIG. 7A is a schematic diagram of the strain gages of the load cell of FIGS. 6A and 6B connected together in the arms of a Wheatstone bridge circuit, illustrating specifically the compressive and tensile strains due to shear stresses associated with the load $(F)$ and measured by the respective strain gages for producing a signal corresponding to that load $(F)$.
Figure 7B:
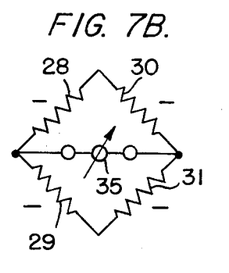
FIG. 7B is a schematic diagram of the strain gages, similar to FIG. 7A, but illustrating specifically the compressive strain due to stresses associated with the axial force $(f_A)$ and measured by the respective strain gages but cancelled by the circuit.
Figure 7C:
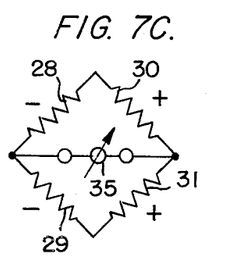
FIG. 7C is a schematic diagram of the strain gages, similar to FIG. 7A, but illustrating specifically the compressive and tensile strains due to bending stresses associated with the side force $(f_S)$ and measured by the respective strain gages but cancelled by the circuit.
Figure 7D:
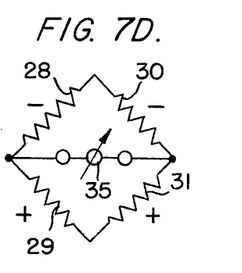
FIG. 7D is a schematic diagram of the strain gages, similar to FIG. 7A, but illustrating specifically the compressive and tensile strains due to shear stresses associated with the twisting moment $(M_T)$ and measured by the respective strain gages but cancelled by the circuit.

Under the influence of the shear strains associated with a load F illustrated in FIGS. 6A and 6B, the resistance of the two strain gages 29 and 30 increases, whereas the resistance of the two other strain gages 28 and 31 decreases, as shown in FIG. 7A. The imbalance of the bridge measured by the voltage measuring instrument 35 will result in a positive signal output corresponding to the magnitude of the load F. The compressive strain measured by the four strain gages when an axial force $f_A$ is applied to the load cell is illustrated in FIG. 7B. It can be seen that the compressive strain are cancelled by the circuit. In like manner, the compressive and tensile strain associated with a side force $f_S$, illustrated in FIG. 7C, are also cancelled by the circuit. Finally, the compressive and tensile shear strain associated with a twisting moment $M_T$, illustrated in FIG. 7D, are likewise cancelled by the circuit.

It can thus be seen that the shear strains associated with a load F can be measured but only with the pair of strain gage devices 26 and 27 having the same strain sensitivity and precisely and symmetrically arranged on opposite sides of the web of the symmetrical I-shaped cross-section to exactly cancel the effects of the strain due to adverse stresses. Such exact positioning of the strain gages 28–31 symmetrically in both recesses 23 and 24 on the opposite sides of the web 34 is difficult to obtain as a practical matter in mass producing such load cells. If a precise mounting of the strain gages 28–31 is provided, then there are generally high costs in manufacturing the load cells. Even with good positioning of the strain gages, temperature variations on opposite sides of the web and in the load cell continue to adversely affect proper cancellation. Accordingly, while there can theoretically be cancellation of strain due to adverse stresses resulting from a twisting moment $M_T$, an axial force $f_A$, and a side force $f_S$, sensitivity to such moment and adverse forces remains. Moreover, significant costs remain in producing these prior art load cells by having to provide the mechanical mounting and waterproofing of strain gages 28–21 in both recesses 23 and 24 and by having to electrically connect these strain gages 28–31 from both sides together to form the full Wheatstone bridge circuit.

Figure 8A:
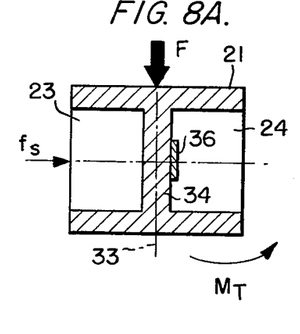
FIG. 8A is a cross-sectional view, similar to FIG. 6A, of the load cell of FIG. 1A, illustrating specifically the application of a centered load $(F)$ and adverse side force $(f_S)$ and twisting moment $(M_T)$ to the beam member of the load cell, but with the positioning of only one strain gage device on one side of the web of the symmetrical I-shaped cross-section for measuring shear strain associated with the load $(F)$.
Figure 8B:
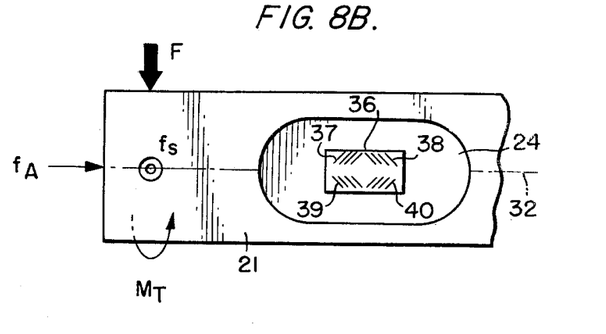
FIG. 8B is a partial side view of the load cell shown in FIG. 8A, illustrating specifically the symmetrical mounting and orientation of the strain gages mounted in only one of the elongated blind holes and the application of a load $(F)$ and adverse side force $(f_S)$, axial force $(f_A)$ and twisting moment $(M_T)$ to the beam member of the load cell.

In an effort to reduce the cost of producing such shear beam load cells, experiments were conducted on a shear beam load cell having a structure as best seen in FIGS. 8A and 8B by mounting only a single strain gage device 36 comprising four strain gages 37, 38, 39, 40 in one of the two identically-dimensioned recesses 23 and 24 forming a symmetrical I-beam cross-section, with those four strain gages 37–40 then being electrically connected together in a full Wheatstone bridge circuit (FIGS. 9A–9D). In this experiment, the two gages 37 and 40, affected by tension (+), were connected in opposite branches of the Wheatstone bridge circuit, whereas the two gages 38 and 39 affected by compression or negative tension (−) were connected in the other opposite branches of the bridge.

Figure 9A:
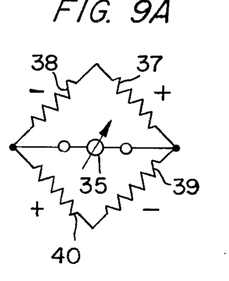
FIG. 9A is a schematic diagram of the strain gages of the load cell of FIGS. 8A and 8B connected together in the arms of a Wheatstone bridge circuit, illustrating specifically the compressive and tensile strains due to shear stresses associated with the load $(F)$ and measured by the respective strain gages for producing a signal corresponding to that load $(F)$.
Figure 9B:
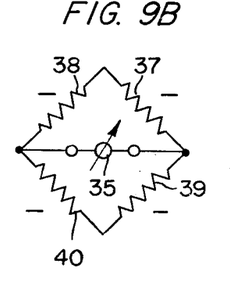
FIG. 9B is a schematic diagram of the strain gages, similar to FIG. 9A, but illustrating specifically the compressive strain due to stresses associated with the axial force $(f_A)$ and measured by the respective strain gages but cancelled by the circuit.
Figure 9C:
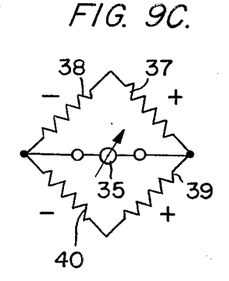
FIG. 9C is a schematic diagram of the strain gages, similar to FIG. 9A, but illustrating specifically the compressive and tensile strains due to bending stresses associated with the side force $(f_S)$ and measured by the respective strain gages but cancelled by the circuit.
Figure 9D:
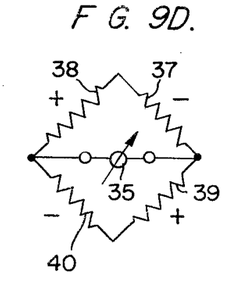
FIG. 9D is a schematic diagram of the strain gages, similar to FIG. 9A, but illustrating specifically the compressive and tensile strains due to shear stresses associated with the twisting moment $(M_T)$ and measured by the respective strain gages but not cancelled by the circuit.

With application of a load F, an axial force $f_A$, a side force $f_S$, and a twisting moment $M_T$, the following outputs were provided by the gages in the Wheatstone bridge circuit as shown respectively in FIGS. 9A–9D. Under the influence of the shear strains in the web of the beam caused by the load F, the resistance of the two strain gage 37 and 40 increases, whereas the resistance of the two other strain gages 38 and 39 decreases; and the imbalance of the bridge measured by the voltage meter instrument 35 constitutes a signal output corresponding to the magnitude of load application force F. This is shown in FIG. 9A. The compressive strain measured by the gages 37–40 when an axial force $f_A$ is applied to the load cell is depicted in FIG. 9B. It can be seen that the compressive strain is cancelled by the circuit. Similarly, as shown in FIG. 9C, the compressive strain caused by stresses associated with a side force $f_S$ are cancelled by the Wheatstone bridge circuit. However, as shown in FIG. 9D, the compressive and tensile strain due to shear stresses associated with a twisting moment $M_T$, or torsion, are not cancelled by the Wheatstone bridge circuit and instead a signal output is produced.

Accordingly, this shear beam load cell configuration of FIGS. 8A and 8B has a high sensitivity to strain associated with torsion or a twisting moment $M_T$ which affects the accurate measurement of the load F applied to the shear beam load cell. During the experimentation, for example, in a 10,000 lb. cell the average longitudinal moment sensitivity was maintained at an acceptable 0.03 percent per ⅛th inch, but the average transverse moment sensitivity was 0.8 percent per ⅛th inch transverse point-of-load movement, an undesirably high sensitivity.

In view of the foregoing, it was considered initially that in order to provide a low cost shear beam load cell using only a single strain gage, sensitivity to side loads, particularly stresses from torsion or a twisting moment $M_T$, had to be sacrificed. However, in accordance with the invention and as described earlier, a lower cost shear beam load cell has been achieved, yet with even less sensitivity to torsion and adverse side forces than the prior art shear beam load cell. In the embodiment of the load cell of FIG. 10A as previously described, the recesses 50 and 52 formed in the cantilevered weigh section 42 had dimensions for defining an unsymmetrical I-shaped transverse cross-section such that the bottom wall surface 60 of recess 52 was made insensitive to torsion. Then, a single composite strain gage device 64 is mounted on the bottom wall surface 60 of the recess 52, as best seen in FIGS. 10B and 10C. The four strain gages 66, 68, 70, and 72 of device 64 are electrically connected together in the four arms of a full Wheatstone bridge circuit, as best seen in FIGS. 11A–11D.

With the dimensions of the recesses 50 and 52 made to form an unsymmetrical I-shaped transverse cross-section such that the bottom wall surface 60 of recess 52 became insensitive to torsion, a single strain gage sensing device 64 positioned on surface 60 could accurately measure the shear strain corresponding to the load F applied to the cantilevered beam member 42 without significant sensitivity to strain associated with a twisting moment and an adverse side force. Unlike a symmetrical I-beam cross-section, however, the neutral axis of torsion and centroidal axis do not coincide with the center line running through the web of an unsymmetrical I-beam cross-section. Thus, it is necessary to determine the location of the neutral axis of torsion and make it coincide with the bottom wall surface of one of the recesses. Otherwise, sensitivity to torsion would remain high. In order to make the bottom wall surface of one of the recesses insensitive to torsion, a formula was used to theoretically place the centroid of an unsymmetrical I-beam cross-section in a plane substantially coinciding to the bottom wall surface 60 of recess 52. Further explanation of stresses, bending, deflections and rotations in unsymmetrical and symmetrical beams is set forth in the publication *Strength of Materials*, by S. Timoshenko, Krieger Publishing Company, and reference thereto is incorporated herein.

Figure 12A:
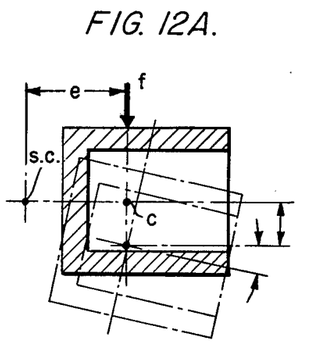
FIG. 12A is a cross-sectional view of an unsymmetrical U-shaped channel member for further explaining the principles of the invention, illustrating specifically the location of the shear center (S.C.) and centroid (C.) for the unsymmetrical U-shaped channel cross-section, application of a force (f) at a distance (e) from the shear center along the plane containing the centroid, and the bending deflection and rotation of the U-shaped channel associated with the force (f) applied thereto.
Figure 12B:
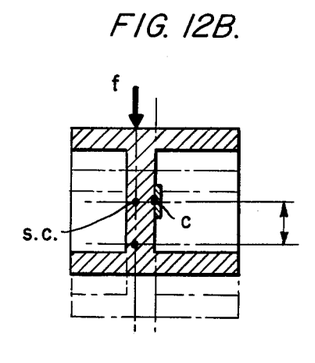
FIG. 12B is a cross-sectional view of an unsymmetrical I-shaped beam member for further explaining the principles of the invention, illustrating specifically the location of the shear center (S.C.) and centroid (C.) for the unsymmetrical I-shaped beam cross-section, application of a force (f) along the plane containing the shear center, and the bending deflection of the I-beam member associated with the force (f) applied thereto.
Figure 12C:
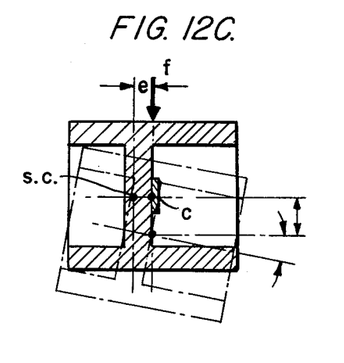
FIG. 12C is a cross-sectional view of an unsymmetrical I-shaped beam member, similar to FIG. 12B, but illustrating specifically application of a force (f) at a distance (e) from the shear center along the plane containing the centroid, and the bending deflection and rotation of the I-beam member associated with the force (f) applied thereto.

To further illustrate the principles of this invention, reference is made to FIGS. 12A, 12B, and 12C. In FIG. 12A, a U-shaped unsymmetrical channel is depicted with the centroid (C.) for the channel cross-section located at a point between the U-shaped channel and the shear center (S.C.) located at a point to the left of the U-shaped channel. The shear center is the point through which the plane of loading must pass to get simple bending without torsion. If a force (f) is applied at a distance (e) away from the shear center along the plane containing the centroid, there is both a component of bending deflection as well as rotation of the U-shaped channel.

In FIGS. 12B and 12C, an unsymmetrical I-shaped cross-section is depicted where the centroid is located along a plane substantially coinciding to the one surface of the web of the I-shaped cross-section, the shear center being located leftwardly of the centroid. If a force (f) is applied along the plane containing the shear center, there is simple bending deflection as shown in FIG. 12B. If a force (f) is applied at a distance (e) away from the shear center along the plane containing the centroid, there is both a component of bending deflection as well as rotation of the unsymmetrical I-beam cross-section, as illustrated in FIG. 12C.

Since the shear center and the centroid of an unsymmetrical beam cross-section do not fall in the same plane, there is inevitably going to be both a bending deflection as well as a rotation during application of a load F on a load cell using an unsymmetrical I-shaped cross-section. For purposes of strength of the shear beam load cell, it is better to maintain the shear center close to the centroid to reduce excessive torsion. Nevertheless, if the plane containing the centroid of the unsymmetrical I-shaped cross-section substantially coincides with the bottom surface 60 of recess 52, then a load F applied to the shear base load cell should be effectively measured and the strain gage device 64 mounted on surface 60 should not be affected by significant sensitivity to strain caused by adverse stresses associated with torsion.

Thus, using the dimensions of the web, flanges, and the recesses as shown FIGS. 14A and 14B, for the embodiment of the load cell of FIG. 10A, location of the centroid of the unsymmetrical I-shaped cross-section on the bottom wall surface of one of the recesses was determined using the following formula:

$$(H - h_1) \cdot \frac{(a_1 + b)^2}{2} + h_1 \cdot \frac{b^2}{2} = (H - h_2) \cdot \frac{a_2^2}{2}$$

or $$t_1 \cdot (a_1 + b)^2 + h_1 \cdot \frac{b^2}{2} = t_2 \cdot a_2^2,$$

wherein
- H = the height of the weigh section 44 of beam member 42 at the unsymmetrical I-shaped transverse cross-section;
- A = the width of the weigh section 44 of beam member 42 at the unsymmetrical I-shaped transverse cross-section.
- $h_1$ = the height of recess 50 having the bottom wall surface 58 that is not to coincide to the plane containing the centroid;
- $h_2$ = the height of recess 52 having bottom wall surface 60 that is to coincide to the plane containing the centroid;
- $a_1$ = the depth of recess 50;
- $a_2$ = the depth of recess 52;
- b = the thickness of web 56 defined at the unsymmetrical I-shaped cross section;
- $t_1$ = the thickness of flanges 74 between the recess 50 and the outer surface of the weigh section 44 of the beam member; and
- $t_2$ = the thickness of the flanges 76 between the recess 52 and the outer surface of the weigh section 44 of the beam member.

Using the above formulas, three specific examples are now set forth for locating the plane containing the centroid for the unsymmetrical I-beam cross-section along the bottom wall surface 60 of recess 52:

EXAMPLE NO. 1

If bottom wall surface 60 is to be equidistant from the side edges of the I-beam cross-section, and $a_2 = a_1 + b$ or $\frac{1}{2}A$, and $t_2 - t_1 = \frac{1}{2}(h_1 - h_2)$, the following ratio exists: $h_2/h_1 = 1 - 2 \times (b/A)^2$.

In a first application, if $b/A = 0.1$, then $h_2/h_1 = 0.98$. The distance (e) from the shear center (S.C.) to the centroid (C.) = $0.632 \times b$.

In a second application, if $b/A = 0.2$, then $h_2/h_1 = 0.92$. The distance (e) from the shear center (S.C.) to the centroid (C.) = $0.3631 \times b$.

It can be seen from Example 1 that by varying the ratio in the heights of the two recesses 50 and 52 in the above-noted manner, and as depicted in FIG. 14B, the plane containing the centroid of the unsymmetrical I-beam cross-section can substantially coincide to the bottom wall surface 60 of recess 52.

EXAMPLE NO. 2

If, instead of Example 1, the thicknesses $t_1$ and $t_2$ of the flanges 74 and 76 are made equal, as depicted in FIG. 14A, then $t_1 = t_2 = t$ and $h_1 = h_2 = h$; and $a_2 = A/2 + c$ and $(a_1 - b) = A/2 - c$. Accordingly, the following ratio exists between the distance c and the web thickness b: $c/b = \frac{1}{4} \times b/A(H/t - 2)$.

In a first application, if $b/A = 0.1$ and $t/H = 0.1$, then the dimensional proportion $c/b = 0.2$. The distance (e) from the shear center (S.C.) to the centroid (C.) = $0.623 \times b$.

In a second application, if the dimensional proportion $b/A = 0.2$ and $t/H = 0.1$, then $c/b = 0.4$. The distance (e) from the shear center (S.C.) to the centroid (C.) = $0.742 \times b$.

From the foregoing, it can thus be seen that the depth $a_2$ of the recess 52 would be greater than the depth $a_1$ of recess 50 and increased in the manner described above in order for the plane containing the centroid of the unsymmetrical I-beam cross-section to coincide to the bottom surface 60 of the recess 52.

EXAMPLE NO. 3

If instead of Example 1 and 2, the depths $a_1$ and $a_2$ of recesses 50 and 52 were made equal, i.e., $a_1 = a_2$, then $c = -b/2$ and $A = 2a + b$, and the following height proportion exists: $h_1/H = h_2/H \times a/(a+2b) + A/a \times b/(a+2b)$.

In a first application, if $b/A = 0.1$, $a/A = 0.45$, and $h_2/H = 0.8$, then $h_1/H = 0.90$. The distance (e) from the shear center (S.C.) to the centroid (C.) = $1.414 \times B$.

In a second application, if $b/A = 0.2$, $a/A = 0.4$, and $h_2/H$ is 0.6, then $h_1/H = 0.93$. The distance (e) from the shear center (S.C.) to the centroid (C.) = $1.477 \times b$.

It can be seen from Example 3 that the distance (e) from the shear center (S.C.) to the centroid (C.) located on the bottom wall surface 60 of the recess 52 is significantly greater than in Examples 1 and 2. Thus, the dimensional proportions set forth in Example 3 are not as practical as those set forth in Examples 1 and 2 because of increased stresses due to greater torsion when applying the load F.

From the foregoing examples, which are not intended to limit the scope of this invention, it can be seen that the recesses 50 and 52 can have predetermined dimensions such that the bottom wall surface 60 in recess 52 of the shear beam load cell coincides substantially to the plane containing the centroids along the longitudinal direction of the unsymmetrical I-beam cross-section. Thus, recess surface 60 should be insensitive to torsion and side forces because of the neutral axis of torsion and the principal plane of bending falling within the plane containing the centroids. In one embodiment, the recess 52 has a depth longer than the depth of recess 50. In another embodiment, the recess 52 has a height shorter than the height of recess 50. A single composite strain gage device 64, comprising strain gages 66, 68, 70, and 72 is mounted on wall surface 60, as shown in FIG. 10D and described earlier, with the gages then connected together in the arms of a full Wheatstone bridge circuit. The two gages, 66 and 72, affected by tension (+), are connected in opposite branches of the bridge, whereas the gages 68 and 70, affected by compression or negative tension (−), are connected in the other opposite branches of the bridge.

With application of a load F, an axial force $f_A$, a side force $f_S$, and a twisting moment $M_T$, the following outputs were provided by the gages in the Wheatstone bridge circuit as shown respectively in FIGS. 11A–11D.

Under the influence of the shear strains in the web of the beam caused by a load F, the resistance of the two strain gages 66 and 72 increases, whereas the resistance of the two other strain gages 68 and 70 decreases. The imbalance of the bridge measured by a voltage measurement instrument 78 constitutes a signal output corresponding to the magnitude of the load F. This is shown in FIG. 11A.

The compressive strain measured by the gages 66, 68, 70, and 72 when an axial force $f_A$ is applied to the load cell is depicted in FIG. 11B. It can be seen that the compressive strain is cancelled by the circuit.

The compressive and tensile strain due to stresses associated with a side force $f_S$ and twisting moment $M_T$ that are registered by the strain gages 66, 68, 70, and 72 are illustrated respectively in FIGS. 11C and 11D. Unlike the prior art shear beam load cell, which registers compression and tension strain associated with a side force $f_S$ and a twisting moment $M_T$ (see FIGS. 7C and 7D), there is no registry of similar strain associated with a side force $f_S$ or twisting $M_T$ by the strain gages mounted in the one recess in the shear beam load cell of this invention. As noted earlier, the compressive and tensile strain associated with twisting moments and side forces registered by the gages in the prior art shear beam load cell had to be cancelled by precise mounting of the strain gages on the opposite sides of the symmetrical I-beam cross-section. Temperature variations also affected cancellation. Because the bottom wall surface 60 of recess 52 in the load cell of this invention substantially coincides to a plane containing the neutral axis of torsion, sensitivity of the single composite strain gage device 64 mounted on wall surface 60 to strain associated with a twisting moment $M_T$ has been eliminated.

The shear beam load cell, in accordance with the invention, thus more accurately measures the shear strain associated with the load F to be measured. In experiments conducted with a 10,000 lb. shear beam load cell having recesses forming an offset web section, or an unsymmetrical I-beam cross-section, the transverse moment sensitivity was less than 0.01 percent per ⅛th inch in transverse point-of-load movement when an off-centered load was applied. This is in contrast to transverse moment sensitivity typically between 0.02 and 0.03 percent per ⅛th inch transverse point-of-load movement in a conventional shear beam load cell (assuming accurate positioning of the pairs of strain gage sensing devices symmetrically on opposite sides of the web of the symmetrical I-beam cross-section). This is also in contrast to the experiments conducted on a 10,000 lb. shear beam load cell having only a single strain gage device mounted on the bottom surface of one of the recesses of a symmetrical I-beam cross-section, as described earlier and as depicted in FIGS. 8A and 8B, wherein transverse moment sensitivity was as much as 0.8 percent per ⅛th inch transverse point-of-load movement.

Figure 13A:
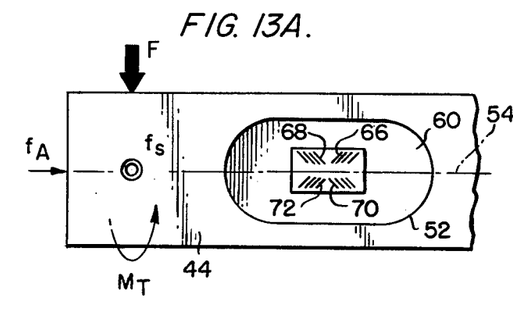
FIG. 13A is a partial side view of the load cell of FIG. 10A, similar to FIG. 10D, but illustrating specifically a different positioning and orientation of the strain gages mounted in the recess on the one bottom wall surface insensitive to torsion.
Figure 13B:
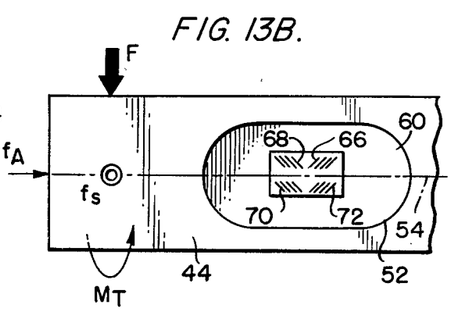
FIG. 13B is a partial side view of the load cell of FIG. 10A, similar to FIG. 10D, but illustrating specifically yet another different positioning and orientation of the strain gages.
Figure 13C:
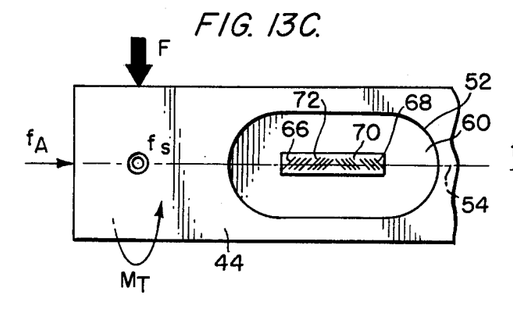
FIG. 13C is a partial side view of the load cell of FIG. 10A, similar to FIG. 10D, but illustrating specifically yet another different positioning and orientation of the strain gages.
Figure 13D:
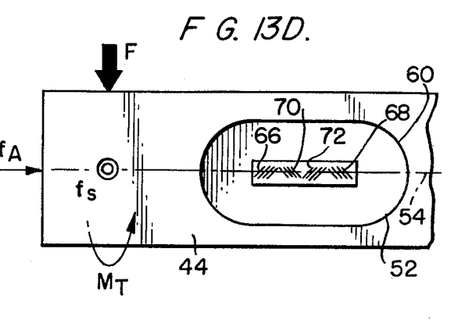
FIG. 13D is a partial side view of the load cell of FIG. 10A, similar to FIG. 10D, but illustrating specifically yet another different positioning and orientation of the strain gages.

While one arrangement of the strain gages 66, 68, 70, and 72 of the strain gage device 64 in recess 52 is illustrated in FIG. 10D, other arrangements for the strain gages can be provided as illustrated in FIGS. 13A, 13B, 13C, and 13D. In FIGS. 13A and 13B, strain gages 66, 68, 70, and 72 remain in symmetry above and below the longitudinal neutral axis 54, but are placed in different 45° and 135° angle orientation in comparison to the arrangement shown in FIG. 10B. The pairs of gages 66, 72, and 68, 70, however, are connected in the opposite branches of the full Wheatstone bridge to achieve the same results as shown in FIGS. 11A–11B. FIGS. 13C and 13D show the strain gages 66, 68, 70, and 72 mounted along the longitudinal neutral axis 54 but are again connected together in the arms of a full Wheatstone bridge circuit in such a manner to provide the same measurements as depicted in FIGS. 11A–11D.

In describing the foregoing principles of the invention, the embodiment of the load cell of FIG. 10A was formed with elongated blind recesses for defining the unsymmetrical I-beam transverse cross-section on which the strain gage device 64 was mounted. For example, it was presumed that there were uniform dimensions to the heights and depths of the recesses and the thicknesses of the flanges along the longitudinal direction of the recesses and that the strain gages would be mounted along the length of a true uniform I-beam transverse cross-section. Thus, it was considered in developing the formulas and calculating the dimensions of the recesses that the centroidal axis and the neutral axis of torsion would fall in a plane coinciding to the plane of the bottom wall surface 60 of the recess 52. The load F was also applied at the end of the cantilevered beam section 42, as illustrated in FIG. 10D, at a distance sufficiently away from the recesses 50 and 52 so that there would be no spurious stress concentrations at the edges of the I-beam cross-section resulting from proximity of the load F.

Figure 15A:
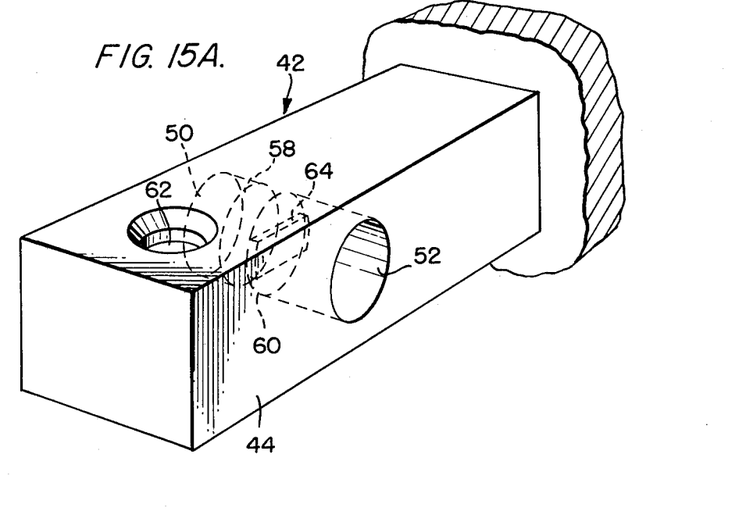
FIG. 15A is a perspective view of another preferred embodiment of the shear beam load cell in accordance with the invention, employing a cantilevered beam member similar to the load cell of FIG. 10A, except that the blind recesses are circular and the load (F) is applied at the end of the cantilevered beam member in closer proximity to the recesses.
Figure 15B:
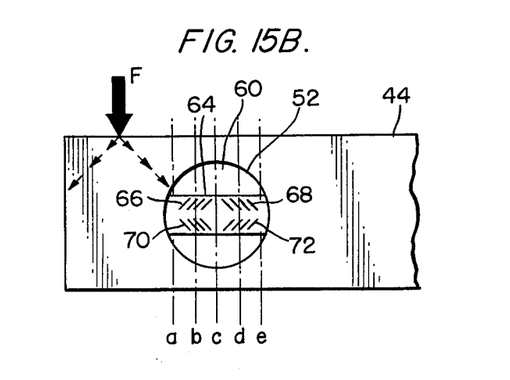
FIG. 15B is a partial side view of the load cell shown in FIG. 15A, illustrating specifically the mounting of the strain gages in the recess on the bottom wall surface which is insensitive to torsion, the spurious stress concentrations affecting portions of the web of the unsymmetrical I-shaped cross-section resulting from proximity to the recesses of the load (F) applied to the beam member of the load cell and the nonuniformity of the I-shaped cross-sections formed by the circular recesses along the longitudinal length thereof.

In practice, however, this structure of a load cell and the foregoing conditions do not always hold true. For example, in order to reduce the size of a shear beam load cell, it has been known to form recesses in a circular hole configuration, rather than an elongated configuration recess, and to apply the load F in close proximity to the circular hole recesses formed in the cantilevered beam section. This type of shear beam load cell, to which the principles of this invention are applied, is illustrated in FIGS. 15A and 15B.

In this second embodiment of the load cell, a single composite strain gage device 64 is mounted again only in the recess 52 which is to have a bottom surface 60 made insensitive to torsion. However, because the strain gages 66, 68, 70, and 72 must now be mounted into a smaller circular recess, the bottom wall surface of the recess may not coincide exactly with a plane that is in-sensitive to torsion. That is, the dimensions of the unsymmetrical I-shaped cross-section taken along sectional lines a–e shown in FIG. 15B will vary, and a true continuous uniformly-dimensional I-beam cross-section does not exist as in an elongated recess. Moreover, due to a certain thickness in the strain gages 66, 68, 70, and 72 mounted on bottom wall surface 60 of circular recess 52, an adjustment should be made to ensure that the surface neutral or insensitive to strain from stresses due to torsion and side bending forces coincides with the force responsive plane of the gages. In addition, with application of the load F in closer proximity to the circular recess hole, stress concentrations resulting from the load F at 45° angles may affect the actual stresses which do occur in certain sections along the I-beam cross-section as depicted in FIG. 15B.

In view of the foregoing, it may be necessary to adjust the dimensions of the recesses so that the plane neutral or insensitive to torsion and side bending forces and the like coincide with the strain gages 66, 68, 70, and 72 as mounted on bottom wall surface 60 of recess 52. From a practical standpoint, these adjustments to the dimensions of the recesses of the load cell in this invention can be made by testing the signal outputs of the gages mounted on an initial shear beam load cell before final mass production.

That is, dimensions of the recesses 50 and 52 can first be determined in accordance with the formulas described earlier with the gages 66, 68, 70, and 72 of the gage device 64 mounted on bottom wall surface 60 of recess 52 and connected together in the arms of the Wheatstone bridge circuit. Measurement is then made to determine if the sensitivity of the gages to the stresses associated with torsion or a twisting moment and a side force are zero. If not, adjustments are necessary and changes are made in the dimensions of the unsymmetrical I-beam cross-section to shift the neutral surface to the desired position. For example, additional material can be removed from the web 56 at the bottom surface 60 of recess 52 opposite to recess 50. The load cell is again tested to determine if the readings of the gages become insensitive to torsion from twisting moments and bending from side forces. Of course, additional material could be removed from the flanges 74 in the recess 50 opposite the recess 52 in which the gages are mounted to accommodate the same adjustments; this would be a preferable approach because the gages can remain mounted in recess 52.

Once the dimensions are adjusted and the gages become insensitive to and twisting moments and side forces, then shear beam load cells of this exact configuration can be mass produced using numerical control or other automated drilling machinery and the like.

It can be seen from the foregoing that all of the advantages previously described can be achieved by the shear beam load cell in accordance with the invention. For example, it is possible to continue to use a number of standard components employed in the industry, but unlike the conventional shear beam load cells, this new type of shear beam load cell is not only lower in cost but has significantly reduced sensitivity to torsion.

It will be apparent, moreover, to those skilled in the art that modifications and variations could be made in the shear beam load cell in accordance with the teachings of the invention without departing from the spirit or scope of the invention. By way of illustration, the shear beam load cell could take the form of a device for weighing railway cars comprising a rail supported at both ends, with strain gages positioned in unsymmetrical recesses in the rail and located at a distance between the end supports. This would be in contrast to a cantilevered beam member having a free end deflectable weigh section with a section securely mounted to a foundation by bolts or the like. Further, the shear beam load cell could take the form of a double shear beam as disclosed by the inventor in U.S. Pat. No. 4,037,469. In addition, the shear beam load cell can be provided with a hole at the forward end thereof in the load measuring direction with a load application force receiving surface in the hole, as further disclosed by the inventor in U.S. Pat. No. 3,960,228.

It can also be appreciated that the shear beam load cell, in accordance with the invention, can be used in all of the typical applications and loading methods used in the industry. Such loading methods and applications include a shear beam load cell having a suspended load assembly, a load button, or a load bearing support member to which a load is applied with the support member being positioned in the load hole of the cell.

Thus, it is intended that the present invention cover the modifications and variations in the shear beam load cell in accordance with the invention within the scope of the appended claims and their equivalents and without limitation to the different environments in which to use a shear beam load cell.

I claim:

1. A shear beam load cell comprising:
   (a) a beam member having—
      (i) a first deflectable weigh portion for receiving a load force to be measured,
      (ii) a second relatively rigid support portion for supporting said beam member, and
      (iii) recesses formed in opposing sides of the first weigh portion for defining an unsymmetrical I-shaped transverse cross-section, wherein the recesses have dimensions such that the bottom wall surface of one of the recesses is insensitive to torsion; and
   (b) strain gage sensing means positioned in said one recess on the bottom wall surface insensitive to torsion for measuring the shear strain corresponding to the load force applied to the first weigh portion.

2. The shear beam load cell of claim 1, wherein said strain gage sensing means comprises strain gages positioned only in said one recess on the bottom wall surface insensitive to torsion, mounted at 45° and 135° angles symmetrical to the longitudinal neutral axis of the first weigh portion and respectively connected to the arms of a Wheatstone bridge circuit for measuring the shear strains corresponding to the load force.

3. The shear beam load cell of claim 2, wherein the recesses have dimensions such that the neutral axis of torsion for the unsymmetrical I-shaped cross-section is located in a plane substantially coinciding to the bottom wall surface of said recess on which said strain gages are mounted.

4. The shear beam load cell of claim 3, wherein the recesses have dimensions such that the centroids along the unsymmetrical I-shaped cross-section are located in a plane substantially coinciding to the bottom wall surface of said recess on which said strain gages are mounted.

5. The shear beam load cell of claim 1, 2, 3, or 4, wherein the recess with the bottom surface insensitive to torsion has a depth longer than the other recess.

6. The shear beam load cell of claim 1, 2, 3, or 4, wherein the recess with the bottom surface insensitive to torsion has a height smaller than the other recess.

7. The shear beam load cell of claims 1, 2, 3, or 4, wherein the beam member comprises a cantilevered beam member with the first deflectable weigh portion being a first free end section of the cantilevered beam member for receiving the load force to be measured, and the second relatively rigid support portion being a mounting section for mounting the cantilevered beam member.

8. The shear beam load cell of claim 1, 2, 3, or 4, wherein the load is applied to the first weigh portion in a plane substantially parallel to the bottom wall surface of the recess insensitive to torsion, and wherein the recesses are formed at a location along the first weigh portion between the second beam member support portion and the position on the first deflectable weigh portion at which the load application force is applied.

9. The shear beam load cell of claim 8, wherein said load force measuring direction extends substantially perpendicular to the longitudinal neutral axis of the first deflectable weigh portion of the beam member.

10. A shear beam load cell comprising:
 (a) a cantilevered beam member having—
  (i) a first free end deflectable weigh section for receiving a load force to be measured,
  (ii) a second mounting section for mounting said beam member, and
  (iii) recesses formed in opposing sides of said cantilevered beam free end weigh section for defining an unsymmetrical I-shaped transverse cross-section, wherein the recesses have dimensions such that the bottom wall surface of one of the recesses is insensitive to torsion; and
 (b) a strain gage sensing means positioned only in said one recess on the bottom wall surface insensitive to torsion for measuring the shear strain corresponding to the load force applied to said free end weigh section.

11. The shear beam load cell of claim 10, wherein the recesses have dimensions such that the neutral axis of torsion for the unsymmetrical I-shaped cross-section is located in a plane substantially coinciding to the bottom wall surface of the recess insensitive to torsion.

12. The shear beam load cell of claim 11, wherein the recesses have dimensions such that the centroids along the unsymmetrical I-shaped cross-section are located in a plane substantially coinciding to the bottom wall surface of the recess insensitive to torsion.

13. The shear beam load cell of claim 12, wherein the recesses have dimensions defined by the formula:

$$(H - h_1) \cdot \frac{(a_1 + b)^2}{2} + h_1 \cdot \frac{b^2}{2} = (H - h_2) \cdot \frac{a_2^2}{2}$$

or $$t_1 \cdot (a_1 + b)^2 + h_1 \cdot \frac{b^2}{2} = t_2 \cdot a_2^2,$$

wherein
 $H$ = the height of the first deflectable weigh section of the beam member at the unsymmetrical I-shaped transverse cross-section;
 $h_1$ = the height of the recess having the bottom wall surface not coinciding to the plane containing the centroids ("first recess");
 $h_2$ = the height of the recess having the bottom wall surface coinciding to the plane containing the centroids ("second recess");
 $a_1$ = the depth of the first recess;
 $a_2$ = the depth of the second recess;
 $b$ = the thickness of the web defined at the unsymmetrical I-shaped transverse cross-section;
 $t_1$ = the thickness of the flange section of the first deflectable weigh section between the first recess and the outer surface of the first weigh section of the beam member; and
 $t_2$ = the thickness of the flange section of the second deflectable weigh section between the second recess and the outer surface of the first weigh section of the beam member.

14. The shear beam load cell of claim 13, wherein the recess with the bottom wall surface coinciding to the plane containing the centroids has a depth longer than the other recess.

15. The shear beam load cell of claim 13, wherein the recess with the bottom wall surface coinciding to the plane containing the centroids has a height smaller than the other recess.

16. The shear beam load cell of claim 13, 14, or 15 wherein the load is applied to the first weigh section in a plane substantially parallel to the bottom wall surface of said recess insensitive to torsion; wherein the recesses are formed at a location along the first weigh section between the second beam member section and the position on the first deflectable weigh portion at which the load force is applied; and wherein said load force measuring direction extends substantially perpendicular to the longitudinal axis of the first deflectable weigh section of the beam member.

17. The shear beam load cell of claim 16, wherein a flat web is defined at the unsymmetrical I-shaped cross-section vertically disposed between the recesses and having side walls forming the bottom surfaces of the recesses, said flat web being in a plane substantially parallel to the load force applied to said first weigh section.

18. The shear beam load cell of claim 17, wherein the strain gage sensing means positioned on the bottom wall surface of said recess insensitive to torsion comprises four strain gages mounted at 45° and 135° angles symmetrical to the longitudinal neutral axis of the beam member first weigh section and respectively connected to the four arms of a Wheatstone bridge circuit for electrically measuring the principal shear strains corresponding to the load force.

19. The shear beam load cell of claim 18, wherein said first weigh section has a hole provided at the forward end thereof in the load measuring direction and a load force receiving surface in said hole.

20. The shear beam load cell of claim 19 further comprising a load bearing support member to which a load force is applied, said support member being positioned in the load hole and the force applied to the support member is received at the load receiving surface.

21. The shear beam load cell of claim 10, 11, 12, or 13, wherein the strain gage sensing means positioned in the recess on the bottom wall surface insensitive to torsion comprises four strain gages mounted at 45° and 135° angles symmetrical to the longitudinal neutral axis of the beam member first weigh section and respectively connected to the four arms of a Wheatstone bridge circuit for electrically measuring the principal shear strains corresponding to the load force.

22. The shear beam load cell of claim 21, wherein said first weigh section has a hole provided at the forward end thereof in the load measuring direction and a load force receiving surface in said hole.

* * * * *